(12) United States Patent
Rajaraman et al.

(10) Patent No.: US 7,399,350 B2
(45) Date of Patent: *Jul. 15, 2008

(54) FLUORINE-FREE DISILOXANE SURFACTANT COMPOSITIONS FOR USE IN COATINGS AND PRINTING INK COMPOSITIONS

(75) Inventors: Suresh K. Rajaraman, Newburg, NY (US); Alain Lejeune, Reignier (FR); Alexander Borovik, White Plains, NY (US); George A. Policello, Ossining, NY (US); Mark D. Leatherman, Stamford, CT (US)

(73) Assignee: Momentive Performance Materials Inc., Wilton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/582,576

(22) Filed: Oct. 17, 2006

(65) Prior Publication Data
US 2008/0090964 A1 Apr. 17, 2008

(51) Int. Cl.
*C09D 11/02* (2006.01)
*B01F 17/54* (2006.01)

(52) U.S. Cl. ............... 106/31.59; 106/31.26; 106/31.89; 524/266; 524/267; 524/268; 516/55; 516/76; 528/25; 528/31; 528/35

(58) Field of Classification Search ............... None
See application file for complete search history.

(56) References Cited

U.S. PATENT DOCUMENTS

| | | |
|---|---|---|
| 3,159,601 A | 12/1964 | Ashby |
| 3,220,972 A | 11/1965 | Lamoreaux |
| 3,299,112 A | 1/1967 | Bailey |
| 3,715,334 A | 2/1973 | Karstedt |
| 3,775,452 A | 11/1973 | Karstedt |
| 3,814,730 A | 6/1974 | Karstedt |
| 5,026,891 A | 6/1991 | Colas et al. |
| 5,104,647 A | 4/1992 | Policello |
| 5,401,871 A | 3/1995 | Feldmann-Krane et al. |
| 5,430,166 A | 7/1995 | Klein et al. |
| 5,430,167 A | 7/1995 | Klein et al. |
| 5,558,806 A | 9/1996 | Policello et al. |
| 5,674,832 A | 10/1997 | Keys |
| 6,046,156 A | 4/2000 | Perry |
| 6,054,547 A | 4/2000 | Perry et al. |
| 6,060,546 A | 5/2000 | Powell et al. |
| 6,075,111 A | 6/2000 | Perry et al. |
| 6,077,923 A | 6/2000 | Perry et al. |
| 6,083,901 A | 7/2000 | Perry et al. |
| 6,153,578 A | 11/2000 | Perry |
| 6,221,811 B1 | 4/2001 | Policello et al. |
| 6,255,511 B1 | 7/2001 | Klein et al. |
| 6,271,295 B1 | 8/2001 | Powell et al. |
| 6,300,283 B1 | 10/2001 | Sakuta |
| 6,489,498 B2 | 12/2002 | Klein et al. |

FOREIGN PATENT DOCUMENTS

| | | |
|---|---|---|
| EP | 0 710 500 | 11/2000 |
| GB | 1 520 421 | 8/1978 |
| WO | WO 2006/102050 A2 * | 9/2006 |
| WO | WO 2006/107082 A2 * | 10/2006 |

* cited by examiner

*Primary Examiner*—Marc S Zimmer
(74) *Attorney, Agent, or Firm*—Dominick G. Vicari

(57) ABSTRACT

The present invention relates to coating and printing ink compositions possessing silicone surfactants compositions comprising fluorine-free organomodified disiloxanes which are resistant to hydrolysis between a pH of about 3 to a pH of about 12. The coatings and printing ink composition of the present invention exhibit enhanced wetting, flow and leveling properties.

51 Claims, 6 Drawing Sheets

FLUORINE-FREE DISILOXANE SURFACTANT COMPOSITIONS FOR USE IN COATINGS AND PRINTING INK COMPOSITIONS

FIELD OF THE INVENTION

The present invention relates to silicone surfactant compositions that exhibit resistance to hydrolysis over a wide pH range. More particularly, the present invention relates to coating and printing ink compositions containing silicone surfactants compositions comprising fluorine-free organomodified disiloxanes which are resistant to hydrolysis between a pH of about 3 to a pH of about 12.

BACKGROUND OF THE INVENTION

The topical application of liquid compositions to the surfaces of both animate and inanimate objects to effect a desired change involve the processes of controlling wetting, spreading, flow, leveling, foaming, detergency, and the like. In recent years, there has been a move to waterborne coatings in place of solvent borne coatings from the viewpoints of resource savings and environmental pollution. For example, waterborne coatings have been investigated for primer coatings, base coatings and top coatings for automobiles. This allows flow-and-leveling agents for waterborne coatings having higher functionality to be required. In order to meet this requirement, acryl base polymers, modified silicone oils and the like have so far been used as flow-and-leveling agents. However, a satisfactory wetting, flow-and-leveling property and an improvement in coating defects are not necessarily achieved with these conventional techniques in the fields requiring a high level of appearance for uses such as automobiles which have been researched in recent years. So either large concentrations of organic surfactants or specialty perfluoroalkyl functionalized surfactants with very low surface tension are added in order to obtain a good appearance. One of the issues with using very high concentrations of organic surfactants is the adverse effects that exerted on other properties of coatings such as layer-to-layer adhesive property in recoating or roughening the surfaces of the recoated films.

Conventional organic surfactants provide only an inadequate solution to the leveling problem in the case of coatings, and there is an urgent need for new surfactants which make it possible to produce absolutely smooth coating films. Alternatively, the specialty fluoro based surfactants are facing pressures from toxicological and bioaccumulation fronts. The U.S. Environmental Protection Agency (EPA) is proposing to tighten regulation of such perfluoroalkyl materials that have the potential of braking down into toxic perfluoroalkyl carboxylates, such as perfluorooctanoic acid (PFOA), and perfluoroalkyl sulfonates, including perfluorooctanyl sulfonate (PFOS). These substances are expected to bioaccumulate, persist in the environment, and are likely to be "highly toxic". Also, studies suggest that perfluoroalkyl sulfonates and carboxylates may get released in the air when items made with certain fluoropolymers are burned in municipal waste incinerators Accordingly, the identification of non-fluorinated surfactants that can avoid environmental and healthconcerns is of interest. The present invention also describes the utility and application of this novel fluorine free surfactant compositions to provide improved flow, leveling and wetting benefits.

SUMMARY OF THE INVENTION

The present invention provides a fluorine-free coating composition comprising:

a) a silicone having the general formula:

MM' where $M = R^1R^2R^3SiO_{1/2}$;

$M' = R^4R^5R^6SiO_{1/2}$;

with $R^1$ selected from the group consisting of branched monovalent hydrocarbon radical of from 3 to 6 carbon atoms and $R^7$, where $R^7$ is selected from the group consisting of $R^8R^9R^{10}SiR^{12}$ and $(R^4R^5R^6)SiR^{12}(Si(R^2R^3)SiO_{1/2})$ with $R^8$, $R^9$, and $R^{10}$ each independently selected from the group of monovalent hydrocarbon radicals having from 1 to 6 carbon atoms and monovalent aryl or alkaryl hydrocarbon radicals having from 6 to 13 carbon atoms and $R^{12}$ is a divalent hydrocarbon radical having from 1 to 3 carbon atoms, $R^2$ and $R^3$ are each independently selected from the group of from 1 to 6 carbon atom monovalent hydrocarbon radicals or $R^1$, with $R^4$ an alkylpolyalkyleneoxide bearing substituent selected from the group consisting of:

$R^{13}(C_2H_4O)_a(C_3H_6O)_b(C_4H_8O)_cR^{14}$ and $R^{12}SiR^4R^5(R^{13}(C_2H_4O)_a(C_3H_6O)_b(C_4H_8O)_cR^{14})$ where $R^{13}$ is a divalent linear or branched hydrocarbon radical having the structure:

—$CH_2$—$CH(R^{15})(R^{16})_dO$— where $R^{15}$ is H or methyl; $R^{16}$ is a divalent alkyl radical of 1 to 6 carbons where the subscript d maybe 0 or 1;

$R^{14}$ is selected from the group consisting of H, monovalent hydrocarbon radicals of from 1 to 6 carbon atoms and acetyl where the subscripts a, b and c are zero or positive and satisfy the following relationships:

$2 \leq a+b+c \leq 20$ with $a \geq 2$, and $R^5$ and $R^6$ are each independently selected from the group of monovalent hydrocarbon radicals having from 1 to 6 carbon atoms or $R^4$; and b) a coating resin, wherein the coating composition exhibits enhanced resistance to hydrolysis.

The present invention further provides a fluorine-free printing ink composition comprising:

a) a silicone having the general formula:

MM' where $M = R^1R^2R^3SiO_{1/2}$;

$M' = R^4R^5R^6SiO_{1/2}$;

with $R^1$ selected from the group consisting of branched monovalent hydrocarbon radical of from 3 to 6 carbon atoms and $R^7$, where $R^7$ is selected from the group consisting of $R^8R^9R^{10}SiR^{12}$ and $(R^4R^5R^6)SiR^{12}(Si(R^2R^3)SiO_{1/2})$ with $R^8$, $R^9$, and $R^{10}$ each independently selected from the group of monovalent hydrocarbon radicals having from 1 to 6 carbon atoms and monovalent aryl or alkaryl hydrocarbon radicals having from 6 to 13 carbon atoms and $R^{12}$ is a divalent hydrocarbon radical having from 1 to 3 carbon atoms, $R^2$ and $R^3$ are each independently selected from the group of from 1 to 6 carbon atom monovalent hydrocarbon radicals or $R^1$, with $R^4$ an alkylpolyalkyleneoxide bearing substituent selected from the group consisting of:

$$R^{13}(C_2H_4O)_a(C_3H_6O)_b(C_4H_8O)_cR^{14} \text{ and}$$

$$R^{12}SiR^4R^5(R^{13}(C_2H_4O)_a(C_3H_6O)_b(C_4H_8O)_cR^{14})$$

where $R^{13}$ is a divalent linear or branched hydrocarbon radical having the structure:

$$-CH_2-CH(R^{15})(R^{16})_dO-$$

where $R^{15}$ is H or methyl; $R^{16}$ is a divalent alkyl radical of 1 to 6 carbons where the subscript d maybe 0 or 1;

$R^{14}$ is selected from the group consisting of H, monovalent hydrocarbon radicals of from 1 to 6 carbon atoms and acetyl where the subscripts a, b and c are zero or positive and satisfy the following relationships:

$$2 \leq a+b+c \leq 20 \text{ with } a \geq 2,$$

and $R^5$ and $R^6$ are each independently selected from the group of monovalent hydrocarbon radicals having from 1 to 6 carbon atoms or $R^4$; and b) at least one printing ink resin, wherein the printing ink composition exhibits enhanced resistance to hydrolysis.

The coating and printing ink compositions of the present invention exhibit enhanced wetting, leveling and flow.

DETAILED DESCRIPTION OF THE INVENTION

Figure 1:
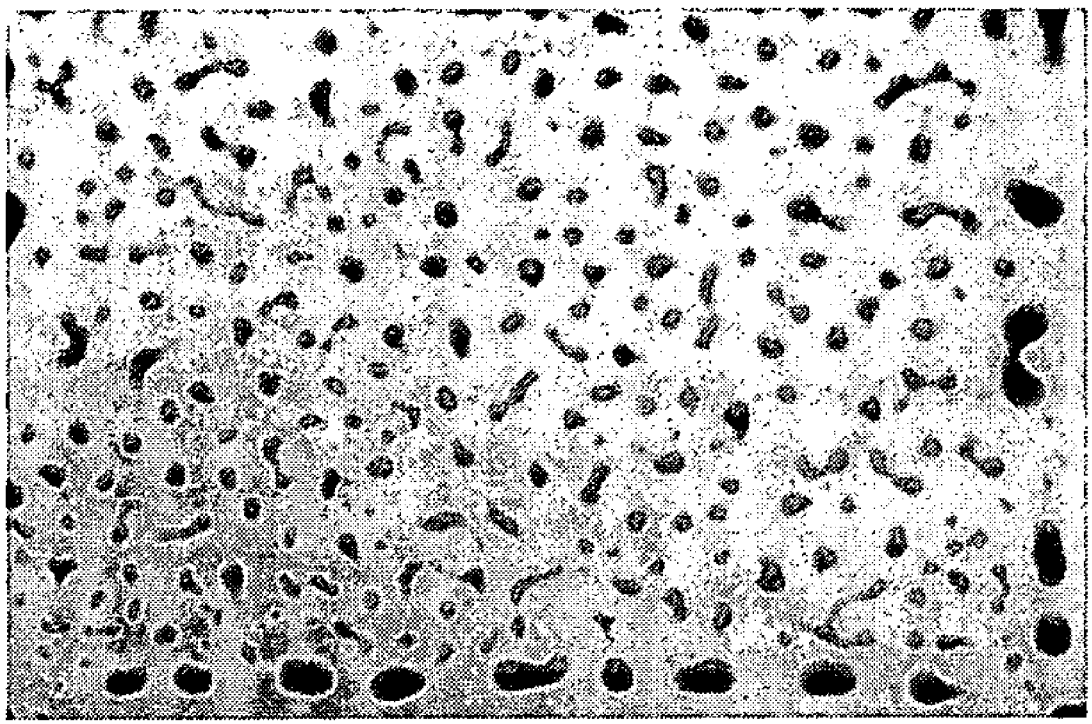
FIG. 1 displays a surface coated with a coating formulation prepared with 1% surfactant Comparative Example OPE.

As used herein, integer values of stoichiometric subscripts refer to molecular species and non-integer values of stoichiometric subscripts refer to a mixture of molecular species on a molecular weight average basis, a number average basis or a mole fraction basis.

The present invention provides for coating and printing ink composition comprising a disiloxane compound or compositions useful as a surfactant having the general formula:

MM' where $$M = R^1R^2R^3SiO_{1/2};$$

$$M' = R^4R^5R^6SiO_{1/2};$$

with $R^1$ a branched monovalent hydrocarbon radical of from 3 to 6 carbon atoms or $R^7$, where $R^7$ is selected from the group consisting of $$R^8R^9R^{10}SiR^{12} \text{ and } (R^4R^5R^6)SiR^{12}(Si(R^2R^3)SiO_{1/2})$$

with $R^8$, $R^9$, and $R^{10}$ each independently selected from the group of monovalent hydrocarbon radicals having from 1 to 6 carbon atoms and monovalent aryl or alkaryl hydrocarbon radicals having from 6 to 13 carbon atoms and $R^{12}$ is a divalent hydrocarbon radical having from 1 to 3 carbon atoms, $R^2$ and $R^3$ are each independently selected from the group of from 1 to 6 carbon atom monovalent hydrocarbon radicals or $R^1$, with $R^4$ an alkylpolyalkyleneoxide bearing substituent selected from the group consisting of:

$$R^{13}(C_2H_4O)_a(C_3H_6O)_b(C_4H_8O)_cR^{14} \text{ and}$$

$$R^{12}SiR^4R^5(R^{13}(C_2C_4O)_a(C_3H_6O)_b(C_4H_8O)_cR^{14})$$

where $R^{13}$ is a divalent linear or branched hydrocarbon radical having the structure:

$$-CH_2-CH(R^{15})(R^{16})_dO-$$

where $R^{15}$ is H or methyl; $R^{16}$ is a divalent alkyl radical of 1 to 6 carbons where the subscript d may be 0 or 1;

$R^{14}$ is selected from the group consisting of H, monovalent hydrocarbon radicals of from 1 to 6 carbon atoms and acetyl subject to the limitation that the subscripts a, b and c are zero or positive and satisfy the following relationships:

$$2 \leq a+b+c \leq 20 \text{ with } a \geq 2,$$

and $R^5$ and $R^6$ are each independently selected from the group of monovalent hydrocarbon radicals having from 1 to 6 carbon atoms or $R^4$. When the subscript a satisfies the condition $2 \leq a \leq 4$ it is advisable to utilize a co-surfactant as hereinafter set forth in order to obtain the benefit of the compositions of the present invention.

One method of producing the composition of the present invention is to react a molecule of the following formula:

$$MM^H$$

where $M^H$ is the hydride precursor to the M' structural unit in the composition of the present invention, wherein the definitions and relationships are later defined and consistent with those defined above, under hydrosilylation conditions, with an olefinically modified polyalkyleneoxide, such as allyloxypolyethyleneglycol, or methallyloxypolyalkyleneoxide, which are incorporated herein as examples, and not set forth to limit other possible olefinically modified alkyleneoxide components. As used herein the phrase "olefinically modified polyalkyleneoxide" is defined as a molecule possessing one or more alkyleneoxide groups containing one or more, terminal or pendant, carbon-carbon double bonds. The polyether is an olefinically modified polyalkyleneoxide (hereinafter referred to as "polyether") is described by the general formula:

$$CH_2=CH(R^{15})(R^{16})_dO(C_2H_4O)_a(C_3H_6O)_b(C_4H_8O)_cR^{14}$$

where $R^{15}$ is H or methyl; $R^{16}$ is a divalent alkyl radical of 1 to 6 carbons where the subscript d may be 0 or 1; $R^{14}$ is H, a monofunctional hydrocarbon radical of 1 to 6 carbons, or acetyl. When the polyether is composed of mixed oxyalkyleneoxide groups (i.e. oxyethylene, oxypropylene and oxybutylene) the units may be blocked, or randomly distributed. One skilled in the art will understand the advantages of using a blocked or random configuration. Illustrative examples of blocked configurations are: -(oxyethylene)$_a$(oxypropylene)$_b$-; -(oxybutylene)$_c$(oxyethylene)$_a$-; and -(oxypropylene)$_b$(oxyethylene)$_a$(oxybutylene)$_c$-.

Illustrative examples of the polyether are provided below, but not limited to:

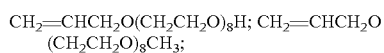

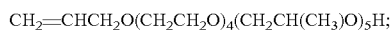

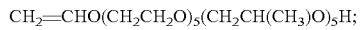

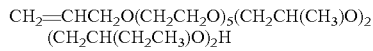

Polyether modified siloxanes are prepared in the normal manner through the use of a hydrosilylation reaction to graft the olefinically modified (i.e. vinyl, allyl or methallyl) polyalkyleneoxide onto the hydride (SiH) intermediate of the disiloxane of the present invention.

Precious metal catalysts suitable for making polyether-substituted siloxanes are also well known in the art and comprise complexes of rhodium, ruthenium, palladium, osmium, iridium, or platinum. Many types of platinum catalysts for this SiH olefin addition reaction are known and such platinum catalysts may be used to generate the compositions of the present invention. The platinum compound can be selected from those having the formula (PtCl$_2$Olefin) and H(PtCl$_3$Olefin) as described in U.S. Pat. No. 3,159,601, hereby incorporated by reference. A further platinum containing material can be a complex of chloroplatinic acid with up to 2 moles per gram of platinum of a member selected from the class consisting of alcohols, ethers, aldehydes and mixtures thereof as described in U.S. Pat. No. 3,220,972 hereby incorporated by reference. Yet another group of platinum containing materials useful in this present invention is described in U.S. Pat. Nos. 3,715,334; 3,775,452 and 3,814,730 (Karstedt). Additional background concerning the art may be found in J. L. Spier, "Homogeneous Catalysis of Hydrosilation by Transition Metals", in Advances in Organometallic Chemistry, volume 17, pages 407 through 447, F. G. A. Stone and R. West editors, published by Academic Press (New York, 1979). Those skilled in the art can easily determine an effective amount of platinum catalyst. Generally an effective amount ranges from about 0.1 to 50 parts per million of the total organomodified disiloxane composition.

The coating and printing ink compositions as well as the siloxanes of the present invention exhibit an enhanced resistance to hydrolysis outside a pH range ranging from 6 to 7.5, i.e. in extreme environmental conditions. An extreme environment is defined as an aqueous solution pH below 6 or above 7.5 or non-aqueous equivalents in terms of Bronsted acidity or basicity or Lewis acidity ort basicity. Enhanced resistance to hydrolysis can be demonstrated by a variety of tests but as used herein enhanced resistance to hydrolysis means 50 mole percent or more of the hydrolysis resistant composition of the present invention remains unchanged or unreacted after a period of a twenty-four hour exposure to aqueous acidic conditions where the solution has a pH lower than 6 or after a period of a twenty-four hour exposure to aqueous basic conditions where the solution has a pH greater than 7.5. Under acidic conditions the compositions of the present invention show a survival of 50 mole percent of the original concentration or greater at a pH of 5 or less for a period of time in excess of 48 hours; specifically the compositions of the present invention show a survival of 50 mole percent or greater at a pH of 5 or less for a period of time in excess of 2 weeks; more specifically the compositions of the present invention show a survival of 50 mole percent or greater at a pH of 5 or less for a period of time in excess of 1 month; and most specifically the compositions of the present invention show a survival of 50 mole percent or greater at a pH of 5 or less for a period of time in excess of 6 months. Under basic conditions the compositions of the present invention show a survival of 50 mole percent or greater at a pH of 8 or more for a period of time in excess of 2 weeks; specifically the compositions of the present invention show a survival of 50 mole percent or greater at a pH of 8 or more for a period of time in excess of 4 weeks; more specifically the compositions of the present invention show a survival of 50 mole percent or greater at a pH of 8 or more for a period of time in excess of 6 months; and most specifically the compositions of the present invention show a survival of 50 mole percent or greater at a pH of 8 or more for a period of time in excess of 1 year.

The coating and printing ink compositions of the present invention may be utilized in a variety of forms: as liquid solutions, dispersions of solids in liquids, dispersions of liquids in liquids as the previously described emulsions, solid mixtures or solid solutions either separately or in the forms previously listed in combination one with the other.

a. Coatings

Typically coatings formulations will require a wetting agent or surfactant for the purpose of emulsification, compatibilization of components, leveling, flow and reduction of surface defects. Additionally, these additives may provide improvements in the cured or dry film, such as improved abrasion resistance, antiblocking, hydrophilic, and hydrophobic properties. Coatings formulations may exist as solventborne coatings, waterborne coatings, high solids, neat and powder coatings.

The term "leveling" as defined herein is understood to refer to the ability of the applied coating to form a smooth film in which imperfections left by the applicator, such as a brush or roller, disappear during the drying process. The term "flow" as defined herein refers to the spreadability of the coating and to the ease with which the coating can be applied. The term "wetting" as described herein is the ability of a formulation to wet the surfaces of substrates efficiently without pin-holes and defects.

Paint surfaces are normally not entirely smooth but instead have a more or less structured surface referred to as waviness or else as orange peel. These surfaces may be finely structured, with a short wave, or coarsely structured, with a long wave. In the majority of cases, this waviness is unwanted and a surfactant is necessary to provide flow, leveling and wetting to achieve a surface which is in any way smooth.

The coatings compositions of the present invention can be employed as: architecture coatings for both interior and exterior applications; original equipment manufacturer (OEM) product coatings or finishes for automotive, marine, aircraft, a variety of land transportation, appliances, metal furniture, machinery and equipment, coil, metal containers, insulating varnishes, pipe, packaging, overprint, release, prefinished wood, wood furniture, plastic substrates, scratch off coatings, nonstick cookware, acoustic ceiling tiles, fiber sizing and general metal; Special Purpose coatings such as industrial maintenance coatings, automotive refinish, traffic paints and miscellaneous coatings such as roof, tank, deck coatings, masonry coatings, masonry water repellent and concrete cure and seal coatings, and the like.

Typical coating resin types include but is not limited to polyesters, alkyds, acrylics, epoxies, polyurethanes, chlorinated polyolefins, polyvinylidene fluoride, urethane-polyester copolymers, styrene-butadiene, acrylic-urethane copolymers, PVC, epoxy esters, epoxy-aminos, epoxy-phenolic, phenolic, styrene-acrylic, epoxy acrylic, urethane-acrylic, silicone, acylic-polyesters, epoxy-polyamide, fluoropolymer, polyvinyl acetate, vinyl-acrylic, silicone-acrylic, vinyl acetate-ethylene, styrene-acrylic, asphalt, coal tar, styrene butadiene, hydrocarbon, vinyl acetate-acrylic and silane systems, and mixtures thereof in amount know and conventional in the art.

Accordingly, an object of the present invention is to provide novel disiloxane surfactants capable of being utilized for uses that requires a high level of aesthetics and appearance and that does not have disadvantages associated perfluorinated surfactants while providing increased resistance to hydrolysis.

Coating Additives

Buffers, preservatives and other standard additives as known in the art can be included in the coating composition of the invention in known and conventional amounts.

Solvents can be included in coating compositions of the present invention. Typically, the solvents are in a liquid state at room temperature. Suitable solvents include water, alcohols, aromatic solvents, oils (i.e. mineral oil, vegetable oil, silicone oil, and the like), lower alkyl esters of vegetable oils, fatty acids, ketones, glycols, polyethylene glycols, diols, paraffinics, and the like. In one specific embodiment of the invention, the solvent is selected from the group consisting of 2,2,4-trimethyl, 1-3-pentane diol, n-methyl-pyrrilidone and alkoxylated (especially ethoxylated) versions thereof as illustrated in U.S. Pat. No. 5,674,832, incorporated by reference herein.

Co-Surfactants:

Co-surfactants can be included in the coating compositions of the present invention. According to one embodiment of the invention, typical co-surfactants include nonionic, cationic, anionic, amphoteric, zwitterionic, polymeric surfactants, or any mixture thereof. The co-surfactants are typically hydrocarbon based, silicone based or fluorocarbon based.

Moreover, other co-surfactants, that have short chain hydrophobes that do not interfere with superspreading as described in U.S. Pat. No. 5,558,806, incorporated by reference herein, are also useful.

Other useful co-surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates. and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and so forth.

In one embodiment of the invention, the amount of co-surfactant employed in the coating composition ranges from about 0.01 to about 5 weight percent of the total composition. In another embodiment of the invention, the amount of co-surfactant employed in the coating composition ranges from about 0.05 to about 2 weight percent of the total composition. In yet another embodiment of the invention, the amount of co-surfactant employed in the coating composition ranges from about 0.01 to 1 weight percent of the total composition.

Specific examples of co-surfactants include alkyl acetylenic diols (SURFONYL—Air Products), pyrrilodone based surfactants (e.g., SURFADONE—LP 100—ISP), 2-ethyl hexyl sulfate, isodecyl alcohol ethoxylates (e.g., RHODA-SURF DA 530—Rhodia), ethylene diamine alkoxylates (TETRONICS—BASF), ethylene oxide/propylene oxide copolymers (PLURONICS—BASF), Gemini type surfactants (Rhodia) and diphenyl ether Gemini type surfactants (e.g. DOWFAX—Dow Chemical).

In a specific embodiment of the invention, the co-surfactant is at least one selected from the group consisting of ethylene oxide/propylene oxide copolymers (EO/PO); amine ethoxylates; alkyl polyglycosides; and oxo-tridecyl alcohol ethoxylates.

The fluorine-free disiloxane surfactants of the invention, as more fully described herein above, are used in the coating formulations in relatively small amounts. In one embodiment of the invention, the amount of silicone surfactant employed in the coating composition ranges from about 0.01 to about 5 weight percent of the total composition. In another embodiment of the invention, the amount of silicone surfactant employed in the coating composition ranges from about 0.05 to about 2 weight percent of the total composition. In yet another embodiment of the invention, the amount of silicone surfactant employed in the coating composition ranges from about 0.01 to 1 weight percent of the total composition.

The surfactants of the invention can be used as solutions, emulsions or 100% substances, depending on the nature and mode of application of the coating material.

b. Printing Inks

Printings inks and graphic arts products are homogeneous products which consist of pigments, dyes or any kind of coloring matter that can be used to provide aesthetic or functions to printed materials. These functions include visibility, rheology, light fastness and few other parameters useful for product identification or protection. Pigments will be treated in order to be sustained in homogeneous form that will allow their transfer from liquid to solid with appropriate printing equipments. To do so vehicles constituted of binders and solvents will be used to provide the necessary flow to the ink composition. The printing technologies used will affect the possible use of binders and solvents used to manufacture the ink.

The inks technologies can be divided broadly into the following categories: lithographic process (to which belong lithography and offset technologies); typographic process (to which belong flexography) or gravure process (to which belong gravure technologies); and Non Impact Process and Digital Imaging systems which are new emerging technologies applied in particular in computerized edition. It is noticeable that in all the processes involved one of the most critical issue is the transfer from a liquid ink to solid state onto substrate of various nature that have very different surface activities. Thus, in all the printing inks systems surface activity of the liquid and solids is an important part of the quality of printing.

In liquid inks, applied by either flexographic or gravure processes, the ink technologies can be quite similar in terms of composition and will mainly differ by the specifications of inks in terms of viscosity, solvent type, pigment concentration and other parameters induced by the end use application.

Liquid inks can be divided into solventborne (SB), radical curing (UV) or water based systems (WB).

The nature of the solvent used will obviously affect the binder and polymer selection used to design the inks. In SB systems low boiling point alcohols and esters will be used. The type of resins used are therefore selected to be soluble in these solvents The most common grades are nitrocellulosic, polyurethanes, acrylics soluble, polyamides, ketonic or maleic resins, polyvinyl chlorides, epoxies, isocyanates, polyvinyl butyral and the like.

In WB systems, solvent being mainly water, the resins have to be designed in a way that they can be diluted or soluble in water but once applied should be resistant to water and humidity. This apparent contradiction has been overcome by use of anionic (or cationic) based polymers that have the ability to release and loose or block their hydrophilic or hydrosoluble moiety upon drying. Also curing polymers are used based on non ionic polymer cured with appropriate curing agents like isocyanates or epoxys or melamines. Typical products used in this area include acrylic and styrene acrylic emulsions or latexes, polyurethane dispersions, epoxy dispersions, polyacrylates, polyvinylic dispersions, soluble polyamides or maleic resins and the like.

UV inks typically do not contain solvents but are mainly constituted of low molecular weight polymers or oligomers diluted with monomers when necessary. The different components are selected to be cured under radical polymerization upon exciting with UV lamps in association with photo initiators. Typical polymers include acrylates, epoxy acrylates, urethane acrylates, polyesters acrylates and their relative monomers bearing unsaturations.

Pigments, thickeners and other standard additives as known in the art can be included in the printing ink composition of the invention in known and conventional amounts.

In liquid inks the pigments, fillers or particulates giving the visual aspect of the inks have to be very well dispersed and grinded in order to reach appropriate flow and leveling on the substrates and during transfer from the press. To do so surface active dispersing agents or binders acting as polymeric dispersants are used. Specific grades of the resins mentioned above have the ability to properly disperse and sustain pigments in the appropriate form. Surface-active agents of many different natures are also used to disperse pigments. We can also find anionic dispersants like alkyl phosphates, sulphonates or sulfates and the like), cationic dispersant (like quaternary ammoniums), amphoteric dispersant (like betaines, or alkly ethoxylates (like formerly used nony phenol ethoxylate, alcohol ethoxylates and the like), polyether siloxane (Like EO/PO modified silicones). Because of their chemical structure and the electrostatic method of stabilization of the pigment particles, surfactants may cause different defects: Water sensitivity, Foam formation, Interference with intercoat adhesion. The use of appropriate surface-active agents to compensate or minimize these defects becomes then almost mandatory in many applications.

Beside the pigments dispersion, other ingredients are used to finalize the properties required by the ink; transfer from printing unit, wetting of substrates, adhesion, specific resistances (like thermal or chemical resistances) or properties (like gloss). Typical formulation usually comprises several polymer systems providing different effects, and it is not rare to see complex formulation with more three or four different binders. The binders listed above are again involved to different extents depending on their individual contributions to the required properties.

Beside the binders additional ingredients will be provided that have other functions. Among these, defoamers (active to reduce foam) or antifoam (active to prevent foam formation) are very important classes. This in particular true for WB system were surface tension of the main solvent is the main responsible for foam generation. Silicone based and non silicone based defoamers are very often described. The silicone based defoamers consist of either emulsion forms or pure silicone and modified silicone oil in water together or not with silica particles or pure or emulsion forms of so called polyether siloxane based material. Silicones are sometimes viewed as critical in printing inks due to their high efficiency which can lead to multiple drawbacks among which fishe eyes is the most critical one. Non silicone based defoamers consist mainly of mineral oil based material and non mineral based material emulsified or not together with hydrophobic solids.

Though necessary, defoamers tend to create leveling and wettability problems that other additives known as wetting agents or spreaders will tend to minimize or suppress. Typical leveling and wetting agents include also silicone based and non silicone based surfactants. Typical non silicone based material include diethylenic surfactants, specific alkyl and alkyl aryl ethoxylates and fluoro carbon based surfactants are particularly effective. One of the issues with the typical silicone surfactant is its hydrolytic instability outside neutral pH conditions. Since most of the ink formulations have a pH on the basic side (pH 7-10), the surfactant compositions of the present invention are very useful in printing ink formulations.

Beside defoamers typical printing inks will also contain ingredients that can reduce or adjust coefficient of friction (COF). Here again we can differentiate silicone based additives and non silicone based additives. The non silicone based additives are natural, chemical or petroleum derivatives like natural waxes, (carnauba waxes and the like), olefinic waxes (PE or PP waxes), fluorinated waxes (PTFE), chemical waxes (amids). Other additives may include plasticizers (like phatlates, phosphates), glycols and coalescing agents.

Glycols and coalescing agents are also involved when WB inks are designed to modify film formation temperature or drying speed. Among these we can discriminate; Oxide-based glycol ether solvents (like Ethylene glycol monomethyl ether, Ethylene glycol monoethyl ether, Ethylene glycol monopropyl ether, Butyl carbitol, Dipropylene glycol dimethyl ether, butyl glycol, butyldiglycol) and Esters based solvents like (Ethylene glycol monobutyl ether acetate, Diethylene glycol monoethyl ether acetate, methoxypropylacetate, Butyl cellosolve actetate).

Another important ingredient almost always present in inks is adhesion promoter. The nature of some substrates sometimes require special additives that can enhance the adhesion of printing inks on them. Among these the most classical known products are chelates of titanates (like titanium acetyl acetonate) or zirconium (like zirconium carbonates or propionates), zinc oxides solutions, polyaziridines (though caricinogenic materials), organofunctional silanes (like Epoxy silane Silquest A-187 or A-1871, amino silane Silquest A-1120), imines (like polyethylene imine). Numerous other additives may include also optical brighteners, humectants (urea or phenols based material to avoid skin drying), UV absorbers (for light stability), rheological agents (thixotropic or sag reducing agents, thickeners), amines (for pH adjustements), biocides and so on.

A typical WB formulation is as follows: Organic pigment dispersion made with surfactant or acrylic solution resin in water; Polymer emulsion (stryrene acrylic or urethane dispersion); Acrylic solution resin; PE wax dispersion; Silicone based antifoam; Non silicone based antifoam; Wetting agent; Thixotropic agent; Thickener; Coalescing agent; Alcohol; and Water.

EXAMPLES

The invention is illustrated by the following non-limiting examples:

The hydride intermediates for the organomodified disiloxane surfactant compositions of the present invention were prepared as follows.

Intermediate Example 1

Intermediate Example 1 was prepared with 1-(2-trimethylsilylethyl)-1,1,3,3-tetramethyldisiloxane (See Structure 1). A 250 mL round bottom flask was charged with tetramethyldisiloxane (51.6 g) and Wilkinson's catalyst ((PPh$_3$)$_3$RhCl, 100 ppm), stirred under N$_2$, and brought to 60° C. Trimethylvinylsilane (25.6 g) was charged to an addition funnel, added dropwise at a rate to maintain the reaction temperature <70° C. with cooling (~1 g/min). The reaction was maintained 1 hour at 65° C., then sampled for gas chromatography (GC); found residual tetramethyldisiloxane and 94:6 M'M$^R$: M$^R$M$^R$. Resulting material distilled fractionally under vacuum (approx. 30 mm Hg) to yield 51.6 g M'M$^R$ product, 99.1% GC purity. This product was found to have an Si—H content of 96 cc H$_2$/g by gasiometric titration.

Structure 1:

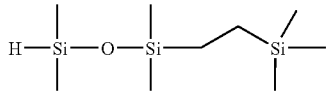

Intermediate Example 2

Intermediate Example 2 was prepared with -(3,3-dimethylbutyl)-1,1,3,3-tetramethyldisiloxane (See Structure 2). A 250 mL round bottom flask was charged with tetramethyldisiloxane (46.1 g), and stirred under N$_2$. A solution of Karstedt's catalyst (Pt(0) in divinyltetramethyldisiloxane, 10 ppm) in 3,3-dimethyl-1-butene (19.3 g) was charged to an addition funnel, and added dropwise at a rate to maintain the reaction temperature <40° C. with cooling (~0.5 g/min). The reaction was maintained 1 hour at 50° C., then sampled for GC; found residual tetramethyldisiloxane, M'M$^R$ product, and M$^R$M$^R$ byproduct (32:53:9). Resulting material distilled fractionally under vacuum (approx. 30 mm Hg) using a 25-cm Vigreux column to yield 25.0 g M'M$^R$ product, >98.1% GC purity. This product was found to have an Si—H content of 100 cc H$_2$/g by gasiometric titration.

Structure 2:

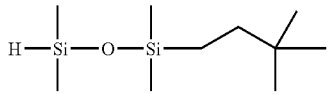

Intermediate Example 3

Intermediate Example 3 was prepared with 1-(2-methylpropyl)-1,1,3,3-tetramethyldisiloxane (See Structure 3). An 80 mL Fischer-Porter high pressure bottle was charged with tetramethyldisiloxane (10.0 g), toluene (10.0 g) and Wilkinson's catalyst ((PPh$_3$)$_3$RhCl, 40 ppm), stirred and brought to 60° C. The bottle was attached to a manifold and pressurized with isobutylene (25 psig) and maintained at 60-70° C. for 8 h. The pressure was vented, and the reaction was sampled for GC analysis; found residual tetramethyldisiloxane, M'M$^R$ product and M$^R$M$^R$ byproduct (2:95:3). The resulting material was stripped under vacuum (approx. 150 mm Hg) at 40° C. to remove olefin and M'M', then filtered with Celite to yield 21.3 g M'M$^R$ product/toluene solution, 94% GC purity. This product was found to have an Si—H content of 11 cc H$_2$/g by gasiometric titration.

Structure 3:

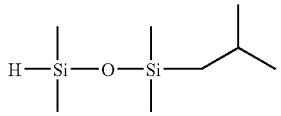

Intermediate Example 4

Intermediate Example 4 was prepared with 1-propyl-1,1,3,3-tetramethyldisiloxane (See Structure 4). An 80 mL Fischer-Porter high pressure bottle was charged with tetramethyldisiloxane (10.0 g), toluene (10.0 g) and Wilkinson's catalyst ((PPh$_3$)$_3$RhCl, 40 ppm), stirred and brought to 50° C. The bottle was attached to a manifold and pressurized with propylene (40 psig) and maintained at 50° C. for 2 h. The pressure was vented, and the reaction was sampled for GC analysis; found M'M$^R$ product and M$^R$M$^R$ byproduct (40:60). The resulting mixture of materials was used without further purification, yield 14.1 g.

Structure 4:

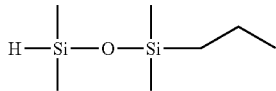

Intermediate Example 5

Intermediate Example 5 was prepared with 1-tert-butyl-1,1,3,3-tetramethyldisiloxane (See Structure 5). A 1 L round bottom flask was charged with water (95 g) and diisopropyl ether (50 g) and stirred. A solution of tert-butyldimethylsilyl chloride (39.5 g) in isopropyl ether (50 g) was charged to an addition funnel, and added dropwise to the water/IPE mixture at a rate to maintain the reaction temperature between 30-35° C. After complete addition, the reaction temperature was brought to 40° C. and maintained for 1 h. A solution of dimethylchlorosilane (24.8 g) in isopropyl ether (50 g) was then charged to the addition funnel, and this solution was added dropwise at 40-45° C. After complete addition, the reaction mixture was heated to reflux for 1 h and allowed to cool. After aqueous workup (washing with water and aqueous NaHCO$_3$, and drying organic fractions over MgSO$_4$), the product was isolated by fractional distillation under vacuum to yield 39.2 g M(R)M' product/isopropyl ether solution (70%/20% by GC analysis). This product was found to have an Si—H content of 79 cc H$_2$/g by gasiometric titration.

Structure 5:

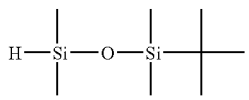

Intermediate Example 6

Intermediate Example 6 was prepared with 1-(dicyclopentadienyl)-1,1,3,3-tetramethyldisiloxane (See Structure 6). A 250 mL RBF was charged with tetramethyldisiloxane (45.3 g), stirred under N$_2$, and brought to 40° C. A solution of Karstedt's catalyst (Pt(0) in divinyltetamethyldisiloxane, 40 ppm) in dicyclolpentadiene (29.8 g) was charged to an addition funnel, and added dropwise at a rate to maintain the reaction temperature <60° C. with cooling (~0.5 g/min). After complete addition, the reaction was maintained 1 h@60° C. The reaction mixture was stripped in vacuo (~30 mm Hg) at 100° C. to yield 41.1 g M'M$^R$ product, >96% GC purity. This product was found to have an Si—H content of 81 cc H$_2$/g by gasiometric titration.

Structure 6:

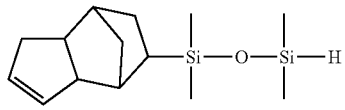

The hydride Intermediates Examples 1-6 were further modified with various allylpolyalkyleneoxides to yield the organomodified disiloxane compositions of the instant invention. Intermediate Examples 1, 2, 3 and, were used to prepare Examples 1-13, and Intermediate Examples 4 and 6 were used to prepare disiloxane surfactant Comparative Examples A-D and H.

Additionally, trisiloxane alkoxylate Comparative Examples were prepared by conventional methods of platinum mediated hydrosilation, as described in Bailey, U.S. Pat. No. 3,299,112, incorporated by reference herein.

Table 1 presents descriptions of the compositions of the present invention. These compositions are described by the general structure:

M*M"

where M*=R$^1$Si(CH$_3$)$_2$O$_{0.5}$; M"=O$_{0.5}$Si(CH$_3$)$_2$Q where R$^1$ is described in Table 2;

Q=—CH$_2$CH$_2$CH$_2$O(CH$_2$CH$_2$O)$_a$(CH$_2$CH(CH3)O)$_b$R$^2$

TABLE 1

Description of Organomodified Disiloxane Surfactant Compositions

| Examples | R$^1$ | a | b | R$^2$ |
|---|---|---|---|---|
| Example 1 | (CH$_3$)$_2$CHCH$_2$— | 7.5 | 0 | CH$_3$ |
| Example 2 | CH$_3$CH$_2$CH$_2$— | 7.5 | 0 | CH$_3$ |
| Example 3 | (CH$_3$)$_2$CHCH$_2$— | 7.5 | 0 | H |
| Example 4 | (CH$_3$)$_2$CHCH$_2$— | 11 | 0 | H |
| Example 5 | (CH$_3$)$_3$C— | 7.5 | 0 | CH$_3$ |
| Example 6 | (CH$_3$)$_2$CHCH$_2$— | 7.5 | 0 | H |
| Example 7 | (CH$_3$)$_2$CHCH$_2$— | 11 | 0 | H |
| Example 8 | (CH$_3$)$_2$CHCH$_2$— | 7.5 | 0 | CH$_3$ |
| Example 9 | (CH$_3$)$_3$SiCH$_2$CH$_2$— | 7.5 | 0 | H |
| Example 10 | (CH$_3$)$_3$SiCH$_2$CH$_2$— | 7.5 | 0 | CH$_3$ |
| Example 11 | (CH$_3$)$_3$SiCH$_2$CH$_2$— | 11 | 0 | H |
| Example 12 | (CH$_3$)$_3$SiCH$_2$CH$_2$— | 5 | 2.5 | H |
| Example 13 | (CH$_3$)$_3$SiCH$_2$CH$_2$— | 6.3 | 0 | H |

Table 2 presents descriptions of disiloxane based surfactant Comparative Examples.

TABLE 2

Comparative Examples A-D and H Siloxane Based Surfactants

| Comparative Examples | R$^1$ | a | b | R$^2$ |
|---|---|---|---|---|
| Comparative Example A | CH$_3$— | 7.5 | 0 | H |
| Comparative Example B | CH$_3$— | 7.5 | 0 | CH$_3$ |
| Comparative Example C | CH$_3$— | 11 | 0 | H |
| Comparative Example D | (dicyclopentadienyl group) | 11 | 0 | H |
| Comparative Example H | (dicyclopentadienyl group) | 7.5 | 0 | H |

Table 3 presents descriptions of commercially available organosilicone polyether based surfactants Comparative Examples E-G of the general structure:

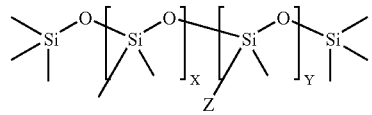

where Z=—CH$_2$CH$_2$CH$_2$O(CH$_2$CH$_2$O)$_a$(CH$_2$CH(CH3)O)$_b$R$^2$

TABLE 3

Comparative Examples E–G Organosilicone Polyether Surfactants

| Comparative Examples | x | y | Z Group a | b | R$^2$ |
|---|---|---|---|---|---|
| Comparative Example E | 0 | 1 | 7.5 | 0 | CH$_3$ |

TABLE 3-continued

Comparative Examples E–G Organosilicone Polyether Surfactants

| Comparative Examples | x | y | Z Group a | b | $R^2$ |
|---|---|---|---|---|---|
| Comparative Example F | 0 | 1 | 7.5 | 0 | H |
| Comparative Example G | 20 | 3 | 7.5 | 0 | $CH_3$ |

Comparative Example OPE (Octylphenolethoxylate, containing 10 polyoxyethylene units) is a non-silicone organic surfactant. This product is available as Triton® X-100 from Dow Chemical Company, Midland, Mich.

Table 4 demonstrates the ability of the organomodified disiloxane composition of the present invention to reduce aqueous surface tension thereby showing utility as surfactants.

Surface tension was measured using a Kruss surface tensiometer, with a sand blasted platinum blade as the sensor. Solutions of the various components were prepared at 0.1 wt % in 0.005M NaCl water (Deionized), as an equilibrium aid.

Table 4 shows that solutions of these unique compositions provide a significant reduction in surface tension relative to the conventional surfactant.

The compositions of the present invention also provide spreading properties similar to the trisiloxane alkoxylates (TSAs) of Comparative Examples E and F, and Comparative Example (disiloxane surfactants) A, B, C, D and H. Additionally, organomodified disiloxane surfactants of the present invention provide improved spreading relative to the conventional silicone polyether, Comparative Example G and conventional organic surfactant product Comparative Example OPE (Table 4).

Spreading was determined by applying a 10 μL droplet, of surfactant solution to polyacetate film (USI, "Crystal Clear Write on Film") and measuring the spread diameter (mm) after 30 seconds, at a relative humidity between 50 and 70% (at 22 to 25° C.). The solution was applied with an automatic pipette to provide droplets of reproducible volume. Deionized water that was further purified with a Millipore filtration system was used to prepare the surfactant solutions.

TABLE 4

Surface Tension and Spreading Properties

| | Surface Tension | Spread Diameter (mm) | | |
|---|---|---|---|---|
| | mN/m | 0.1% | 0.2% | 0.4% |
| Example 1 | 23.3 | 40 | 42 | 50 |
| Example 2 | 23.6 | 34 | 36 | 33 |
| Example 3 | 24.0 | 12 | 14 | 24 |
| Example 4 | 24.1 | 8 | 9 | 10 |
| Example 5 | 23.5 | 32 | 48 | 45 |
| Example 6 | 23.2 | 41 | 33 | 23 |
| Example 7 | 23.9 | 14 | 15 | 25 |
| Example 8 | 24.0 | 23 | 33 | 41 |
| Example 9 | 22.8 | 14 | 25 | 49 |
| Example 10 | 23.0 | 15 | 27 | 34 |
| Example 11 | 24.5 | 20 | 21 | 32 |
| Example 12 | 24.3 | 7 | 8 | 10 |
| Example 13 | 22.2 | 14 | 32 | 27 |
| Comp. Ex. A | 23.4 | 8 | 36 | 58 |
| Comp. Ex. B | 24.3 | 8 | 12 | 44 |
| Comp. Ex. C | 24.1 | 6 | 8 | 9 |

TABLE 4-continued

Surface Tension and Spreading Properties

| | Surface Tension | Spread Diameter (mm) | | |
|---|---|---|---|---|
| | mN/m | 0.1% | 0.2% | 0.4% |
| Comp. Ex. D | 32.7 | 7 | nd | nd |
| Comp. Ex. E | 20.9 | 53 | 51 | 25 |
| Comp. Ex. F | 20.6 | 53 | 50 | 35 |
| Comp. Ex. G | 23.6 | nd | nd | 6 |
| Comp. Ex. H | nd | nd | nd | 7 |
| Comp. Ex. OPE | 31.8 | nd | nd | 10 |

Hydrolytic stability was determined for representative compositions of the present invention using High Performance Liquid Chromatography (HPLC). Solutions of the various compositions were prepared at 0.5 wt % over a pH range from pH 4 to pH12, and monitored by HPLC for decomposition as a function of time.

Analytical Method:

The samples were analyzed by a reverse-phase chromatographic technique using the experimental conditions displayed in Table 5.

TABLE 5

Solvent Gradient for HPLC Method

| Time (min.) | % Methanol | % Water | % Isopropanol |
|---|---|---|---|
| 0.0 | 70 | 30 | 0 |
| 15.0 | 100 | 0 | 0 |
| 20.0 | 50 | 0 | 50 |
| 20.1 | 70 | 30 | 0 |
| 25.0 | 70 | 30 | 0 |

Detector: Evaporative Light Scattering with Low Temperature Adapter (ELSD/LTA)

Conditions: 30° C., 1.95 SLPM $N_2$

Column: Phenomenex LUNA C18 end cap, 5 micron, 75×4.6 mm

Flow Rate: 1.0 mL/min.

Inj. Volume: 10 microlitres

Sample: 0.050 g/mL in methanol

Tables 6-16 present data that the compositions of the present invention provide improved resistance to hydrolytic decomposition compared to siloxane-based surfactants of Comparative Examples B and E under similar pH conditions.

Comparative Examples B and E show rapid hydrolysis at ≦pH5 and >pH 7, while the organomodified disiloxane surfactants of the present invention demonstrate a higher resistance to hydrolysis under the same conditions.

Although Comparative Example D shows similar resistance to hydrolysis, it does not provide the enhanced spreading properties associated with the organomodified disiloxane surfactants of the present invention. By comparison Comparative example D gave a spread diameter of only 6 mm (0.4%) and had 82% product remaining by HPLC, after 48 hours at pH4, while the organomodified disiloxane surfactant Example 10 gave a spread diameter of 34 mm and maintained 75% product after 1 week, under the same conditions (See Tables 4, 11 and 16).

TABLE 6

Hydrolytic Stability of Siloxane Based Surfactants by HPLC

Stability: % Siloxane Surfactant Remaining

| Examples | Time | pH 4 | pH 5 | pH 7 | pH 9 | pH 10 | pH 11 | pH 12 |
|---|---|---|---|---|---|---|---|---|
| Example 1 | 24 h | 83 | 100 | 100 | 100 | 100 | 100 | nd |
| Example 1 | 1 wk | 8 | 71 | 100 | 100 | 100 | 68 | nd |
| Example 1 | 2.5 wk | 1 | 38 | 100 | 100 | 83 | 35 | nd |
| Example 1 | 15 wk | 0.5 | 4 | 100 | 100 | 42 | 28 | nd |

TABLE 7

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 2 | 24 h | 23 | 88 | 100 | 100 | 100 | 79 | nd |
| Example 2 | 1 wk | 1 | 26 | 100 | 95 | 69 | 17 | nd |
| Example 2 | 2.5 wk | 0 | 7 | 100 | 89 | 44 | 7 | nd |

TABLE 8

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 5 | 1 wk | 65 | 100 | 100 | 100 | 100 | 100 | nd |
| Example 5 | 4 wk | 32 | 76 | 100 | 100 | 100 | 100 | nd |
| Example 5 | 6 wk | 21 | 64 | 100 | 100 | 100 | 100 | nd |

TABLE 9

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 8 | 24 h | 84 | 100 | 100 | 100 | 100 | nd | nd |
| Example 8 | 1 wk | 50 | 100 | 100 | 100 | 100 | nd | nd |
| Example 8 | 2 wk | 31 | 79 | 100 | 100 | 100 | nd | nd |
| Example 8 | 4 wk | 21 | 65 | 100 | 97 | 88 | nd | nd |
| Example 8 | 10 wk | 7 | 45 | 100 | 93 | 83 | nd | nd |

TABLE 10

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 9 | 24 h | 92 | 100 | 100 | 100 | 100 | nd | nd |
| Example 9 | 1 wk | 67 | 100 | 100 | 100 | 100 | nd | nd |

TABLE 11

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 10 | 24 h | 100 | 100 | 100 | 100 | 100 | 100 | 79 |
| Example 10 | 1 wk | 75 | 100 | 100 | 100 | 100 | 93 | 42 |
| Example 10 | 2 wk | 50 | 88 | 100 | 100 | 100 | nd | nd |
| Example 10 | 3 wk | 32 | 80 | 100 | 100 | 100 | 93 | 34 |
| Example 10 | 7 wk | nd | nd | nd | nd | nd | 93 | 11 |
| Example 10 | 7.5 wk | 12 | 56 | 100 | 100 | 100 | nd | nd |
| Example 10 | 11 wk | nd | 48 | 100 | 100 | 100 | nd | nd |
| Example 10 | 13 wk | nd | nd | nd | nd | nd | 95 | nd |
| Example 10 | 17 wk | nd | nd | 100 | 100 | 84 | nd | nd |
| Example 10 | 27 wk | nd | nd | 100 | 100 | 86 | 100 | nd |

TABLE 12

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 11 | 96 h | 100 | 100 | 100 | 100 | 100 | nd | nd |
| Example 11 | 3 wk | 79 | 100 | 100 | 100 | 100 | nd | nd |
| Example 11 | 6 wk | 56 | 100 | 100 | 100 | 100 | nd | nd |
| Example 11 | 11 wk | 10 | 100 | 100 | 100 | 100 | nd | nd |

Note: Stock Solution 2.5 wt %

TABLE 13

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Example 13 | 24 h | 100 | 100 | 100 | 100 | 100 | nd | nd |
| Example 13 | 1 wk | 56 | 100 | 100 | 100 | 100 | nd | nd |

TABLE 14

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Comp. Ex. E | 48 h | 25 | 100 | 100 | 100 | 46 | nd | nd |
| Comp. Ex. E | 1 wk | 0 | 38 | 100 | 53 | 0 | nd | nd |

TABLE 15

Hydrolytic Stability of Siloxane Based Surfactants by HPLC

Stability: % Siloxane Surfactant Remaining

| | Time | pH 4 | pH 5 | pH 7 | pH 9 | pH 10 | pH 11 | pH 12 |
|---|---|---|---|---|---|---|---|---|
| Comp. Ex. B | 24 h | 0 | 0 | 100 | 38 | 0 | nd | nd |

TABLE 16

Hydrolytic Stability of Siloxane Based Surfactants by HPLC

| | | Stability: % Siloxane Surfactant Remaining | | | | | |
|---|---|---|---|---|---|---|---|
| | Time | pH 4 | pH 5 | pH 7 | pH 9 | pH 10 | pH 11 | pH 12 |
| Comp. Ex. D | 48 h | 82 | >95 | >95 | >95 | >95 | nd | nd |
| Comp. Ex. D | 9 days | 44 | 99 | 99 | 99 | 99 | nd | nd |

Unlike traditional siloxane based surfactants, which are subject to rapid hydrolysis under acidic and basic conditions ($\leq$pH 5 and $\geq$pH 9) the organomodified disiloxane surfactants of the present invention provide increased resistance to hydrolysis relative to traditional trisiloxane alkoxylates, e.g., Comparative Examples E and F, as well as the comparative trimethylsilyl terminated disiloxane surfactants, represented by Comparative Example B. An artifact of hydrolysis is observed as a reduction in superpsreading properties over time. Therefore solutions of the organomodified disiloxane surfactants of the present invention, as well as comparative surfactants were prepared at desired use levels and pH. Spreading was determined as a function of time to illustrate resistance to hydrolysis.

Table 17 presents organomodified disiloxane surfactants, Example No. 10 displays improved resistance to hydrolysis, at pH 3, relative to a traditional trisiloxane ethoxylate superspreading surfactant Comparative Example E. As mentioned above, resistance to hydrolysis was observed by monitoring the spreading properties over time. Here a 0.4 wt % solution was prepared at pH 3, and spreading determined according to the procedure in Example 8.

TABLE 17

Spreading Properties at pH 3 Vs Time (h)

| | Time/Spread Diameter (mm) | | | | | | | | |
|---|---|---|---|---|---|---|---|---|---|
| | 0 h | 0.25 h | 0.5 h | 1 h | 2 h | 4 h | 8 h | 24 h | 32 h | 96 h |
| Example 10 | 32 | 39 | 41 | 49 | 48 | 39 | 39 | 36 | 16 | 19 |
| Comp. Ex. E | 48 | 48 | 43 | 42 | 44 | 12 | 12 | 9 | — | — |

In another example the organomodified disiloxane surfactants of the present invention represented by Examples 6 and 11, demonstrate improved resistance to hydrolysis relative to Comparative example F, a trisiloxane ethoxylate super-spreader (See Table 18). Solutions (0.4 wt %) of the surfactants were prepared at pH 4 and pH 5 and spreading properties were observed over time. The test conditions are outlined in Example 8, ie Kruss surface tensiometer described herein above.

TABLE 18

Spreading Properties at pH 4 and pH 5 Vs Time

| | Spreading Diameter (mm) | | | | | |
|---|---|---|---|---|---|---|
| Time | Example 6 pH 4 | Example 6 pH 5 | Example 11 pH 4 | Example 11 pH 5 | Comp. Ex. F pH 4 | Comp. Ex. F pH 5 |
| 0 h | 50 | 46 | 16 | 26 | 50 | 49 |
| 1 h | 48 | 44 | 23 | 23 | 50 | 50 |
| 4 h | 59 | 48 | 23 | — | 46 | 47 |
| 24 h | 49 | 51 | 44 | 24 | 52 | 51 |
| 48 h | 40 | 49 | 38 | 32 | 39 | 49 |
| 72 h | 42 | 50 | 28 | 35 | 16 | 48 |
| 1 wk | 13 | 43 | 8 | 29 | 12 | 52 |
| 2 wk | 11 | 49 | 8 | 33 | 7 | 53 |
| 3 wk | 18 | 47 | 12 | 33 | 6 | 21 |
| 1 mo | 17 | 49 | 10 | 42 | 6 | 15 |

Example 5 shows improved resistance to hydrolysis when compared to Comparative Example E as presented in Table 19. Here surfactant solutions (0.1 wt %) were prepared at pH 4, pH 5, pH 8, pH 9 and pH 10, and the spreading properties over time were observed as described in Example 8.

Table 19 demonstrates that the silicone of Comparative Example E shows a more rapid loss of spreading properties at pH 4, pH 5, pH 9 and pH 10, than product No. 5.

TABLE 19

Spreading Properties vs. Time

| | | Spread Diameter (mm) | | | | |
|---|---|---|---|---|---|---|
| Time | Product | pH 4 | pH 5 | pH 8 | pH 9 | pH 10 |
| 0 h | Example 5 | 53 | 52 | 52 | 51 | 51 |
| | Comp. Ex. E | 56 | 54 | 56 | 54 | 54 |
| 1 h | Example 5 | 52 | 50 | 51 | 50 | 51 |
| | Comp. Ex. E | 55 | 53 | 53 | 56 | 54 |
| 2 h | Example 5 | 54 | 52 | 50 | 49 | 50 |
| | Comp. Ex. E | 51 | 53 | 55 | 55 | 52 |
| 4 h | Example 5 | 51 | 50 | 50 | 48 | 49 |
| | Comp. Ex. E | 41 | 51 | 56 | 53 | 49 |
| 6 h | Example 5 | 51 | 50 | 50 | 48 | 49 |
| | Comp. Ex. E | 35 | 52 | 50 | 53 | 46 |
| 8 h | Example 5 | 48 | 51 | 52 | 49 | 52 |
| | Comp. Ex. E | 29 | 50 | 51 | 51 | 47 |
| 24 h | Example 5 | 51 | 50 | 52 | 51 | 49 |
| | Comp. Ex. E | 7 | 50 | 53 | 50 | 32 |
| 48 h | Example 5 | 39 | 48 | 46 | 46 | 41 |
| | Comp. Ex. E | 6 | 41 | 47 | 43 | 10 |
| 72 h | Example 5 | 33 | 48 | 45 | 45 | 42 |
| | Comp. Ex. E | 6 | 32 | 49 | 44 | 7 |
| 96 h | Example 5 | 23 | 45 | 47 | 46 | 40 |
| | Comp. Ex. E | 6 | 17 | 50 | 41 | 6 |
| 168 h | Example 5 | 8 | 43 | 43 | 44 | 43 |
| | Comp. Ex. E | 5 | 9 | 50 | 32 | 6 |

The impact of other ingredients on spreading was determined by blending the organosilicone disiloxane surfactant of the present invention, with a conventional organic based co-surfactant. Co-surfactants are displayed in Table 20.

TABLE 20

Description of Conventional Co-surfactants

| | Description |
|---|---|
| IDA-5 | Isodecyl alcohol ethoxylate (4-5 EO) |
| IDA-6 | Isodecyl alcohol ethoxylate (5-6 EO) |
| TMN-6 | Trimethylnonylalcohol ethoxylate (6 EO) |
| Oxo-TDA-5 | Oxo-tridecyl alcohol ethoxylate (5 EO) |
| Oxo-TDA-6 | Oxo-tridecyl alcohol ethoxylate (6 EO) |
| APG | $C_{8-10}$ Alkylpolyglucoside |

Blends were prepared as physical mixtures where the weight fraction silicone is represented by α (alpha), indicating that the co-surfactant makes up the balance of the blend ratio. For example when α=0 this indicates that the composition contains 0% of the silicone component and 100% co-surfactant, while an α=1.0 indicates the composition contains 100% silicone, and no (0%) co-surfactant. Mixtures of the two components are represented by the weight fraction α, where α ranges as follows: $0 \leq \alpha \leq 1.0$. By example when α=0.25 this indicates the surfactant mixture is composed of 25% silicone and 75% co-surfactant. These blends are then diluted in water to the desired concentration for spreading evaluation.

Spreading was determined by Kruss surface tensiometer, as described above, at either 0.1 wt % or 0.2 wt % total surfactant.

Table 21 demonstrates that representative examples of the co-surfactants of the present invention provide favorable spreading results, and in some cases provide an unexpected synergistic enhancement, where the spread diameter of the mixture exceeds that of the individual components.

TABLE 21

Effect of Co-surfactants on Blend Spreading Properties

| | | Wt Fraction (α) Silicone Surfactant Spread diameter (mm) | | | | | |
|---|---|---|---|---|---|---|---|
| Run | Silicone | 0 | 0.25 | 0.50 | 0.75 | 1.0 | Co-surfactant |
| 1 | Example 10[a] | 45 | 49 | 23 | 17 | 25 | IDA-5 |
| 2 | Example 10[a] | 35 | 38 | 47 | 26 | 25 | IDA-6 |
| 3 | Example 10[a] | 41 | 38 | 42 | 36 | 25 | TMN-6 |
| 4 | Example 10[a] | 34 | 29 | 23 | 19 | 25 | Oxo-TDA-5 |
| 5 | Example 10[a] | 39 | 42 | 49 | 36 | 25 | Oxo-TDA-6 |
| 6 | Example 10[a] | 10 | 39 | 42 | 35 | 25 | APG |
| 7 | Example 5[b] | 41 | 46 | 47 | 49 | 50 | IDA-5 |
| 8 | Example 5[b] | 19 | 31 | 35 | 46 | 50 | IDA-6 |
| 9 | Example 5[b] | 34 | 38 | 44 | 45 | 50 | TMN-6 |
| 10 | Example 5[b] | 36 | 40 | 44 | 51 | 50 | Oxo-TDA-5 |
| 11 | Example 5[b] | 38 | 40 | 39 | 46 | 50 | Oxo-TDA-6 |
| 12 | Example 5[b] | 8 | 32 | 40 | 48 | 50 | APG |

[a] 0.2 wt % total surfactant
[b] 0.1 wt % total surfactant

The following examples describe the utility and application of these novel surfactant compositions to provide improved flow, leveling and wetting benefits.

Example 14 was prepared as follows:

A model waterborne modified acrylic lacquer formulation based on Rohm and Haas RHOPLEX® 1421 (pH 9.1), as shown in the Table 22 was prepared. The components were slowly mixed in the order they are listed in the table. Two drops of red dye were added to the formulation to allow greater contract of coating photographs. The coatings were applied by standard drawdowns onto opacity charts (manufactured by Leneta Company, Form 2A). The dry film thickness was ~1 mil. Visual evaluations were made one hour after application. The samples were rated using the visual aspect measurements on a scale of 0-5, 0 being coatings that are characterized with high occurrence of pin holing and complete lack of flow, leveling and wetting, 5 is characterized as defect free coatings.

TABLE 22

Waterborne Acrylic Coating Formulation

| Chemicals | Percentage, % |
|---|---|
| Surfactant | 1.00 |
| 2-(2-Butoxyethoxy)ethanol | 10.00 |
| Water | 25.00 |
| RHOPLEX ® 1421 | 64.00 |
| Total | 100.00 |

The flow and leveling and wetting properties of the formulations containing 1% of surfactant Example 10 was compared with 1% of conventional organic wetting agent Comparative Example OPE.

As seen in FIG. 1, formulations containing 1% Comparative Example OPE exhibited a high degree of pinholing and dewetting and a complete lack of flow-leveling and was given a aspect rating of 0.

FIG. 1: Coating made from Table 22 Formulation with 1% surfactant Comparative Example OPE.

Figure 2:
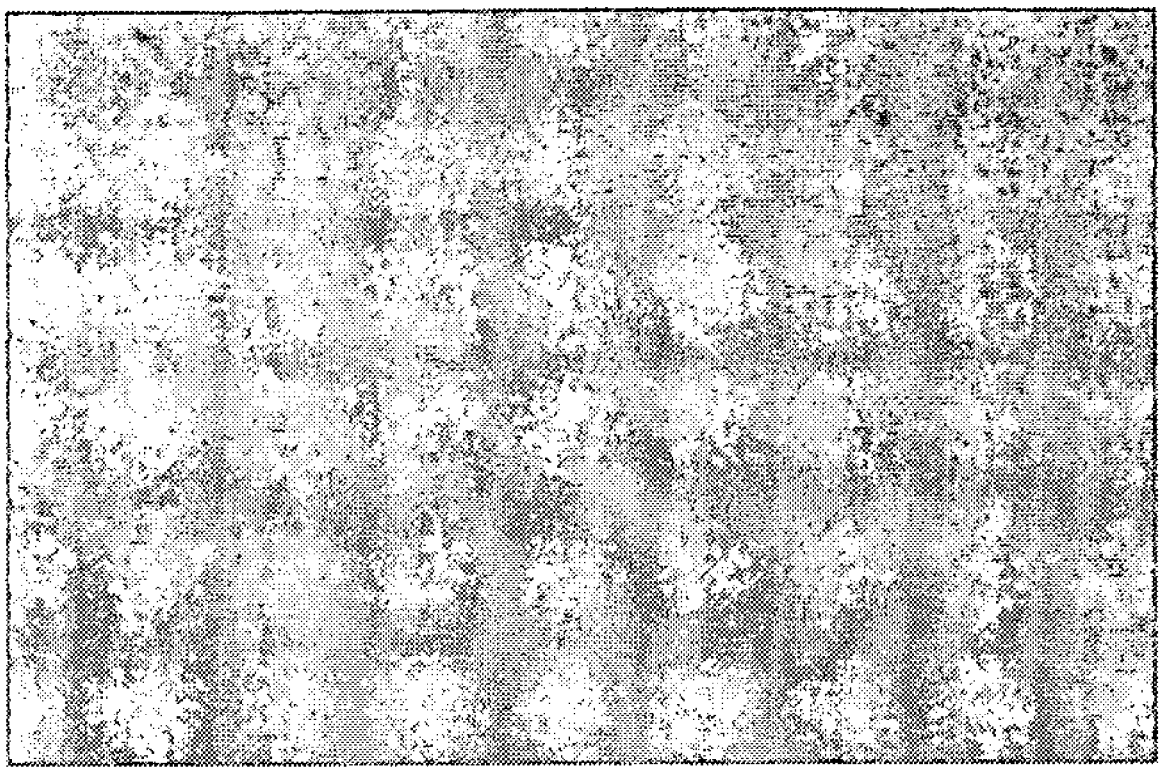
FIG. 2 displays a surface coated with a coating formulation prepared with 1% surfactant Example 10.

In contrast, FIG. 2 shows the improved wetting behavior of formulation with 1% of surfactant Example 10 and was given an aspect ranking of 3.5.

FIG. 2: Coating made from Table 22 Formulation containing 1% surfactant Example 10.

Figure 3:
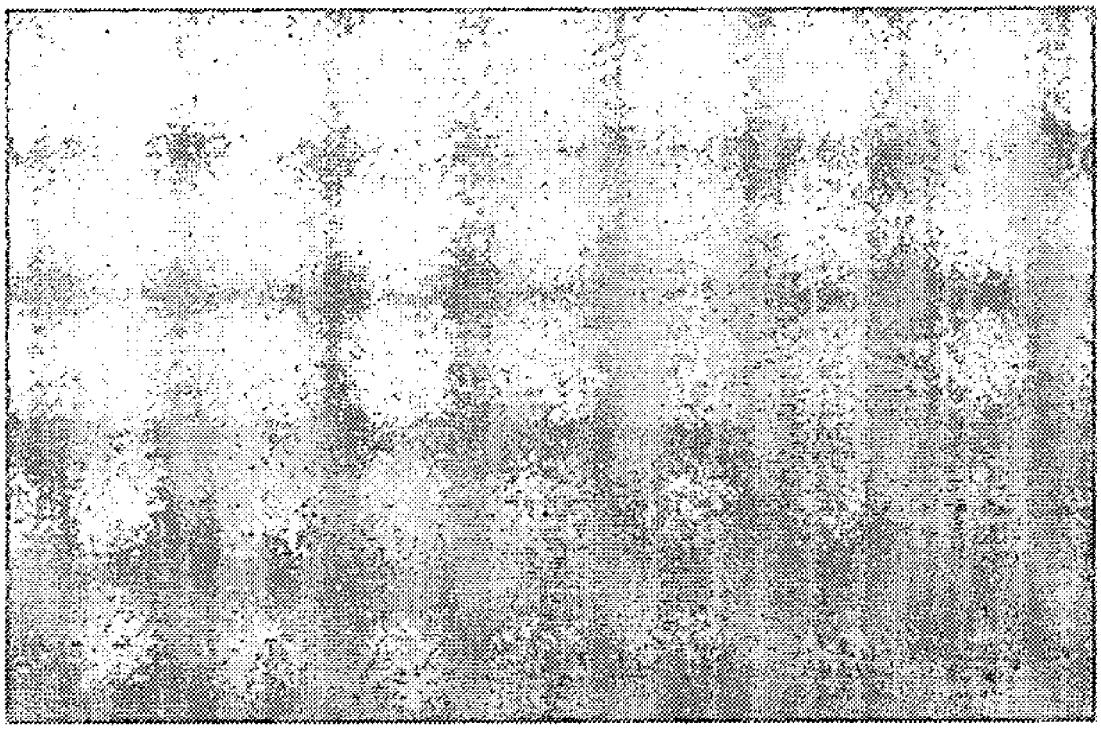
FIG. 3 displays a surface coated with a coating formulation prepared with 1% surfactant Example 10 with 3 months ambient aging.

When the above formulation was aged for 3 months under ambient conditions the aspect performance of the coatings improved to 5 (See FIG. 3).

FIG. 3: Coating made from Table 22 Formulation containing 1% surfactant Example 10 with 3 months ambient aging.

Example 15 was prepared as follows:

A model waterborne polyurethane dispersion (PUD) lacquer formulation based on Daotan® VTW 1236/40WANMP (manufactured by Cytec Surface Specialties Inc.), as shown in the Table 23 was prepared. The components were slowly mixed in the order they are listed in the table. Two drops of red dye were added to the formulation to allow greater contract of coating photographs. The coatings were applied by standard drawdown onto 4"×8" cold rolled steel (CRS) panels provided by ACT laboratories. Prior to use, the excess of machine oil was removed from the panels by wiping with delicate task wipes (manufactured by Kimwipes). The dry film thickness was ~1 mil. Visual evaluations were made one hour after application. The samples were rated using the visual aspect measurements on a scale of 0-5, 0 being coatings that are characterized with high occurrence of pin holing and complete lack of flow, leveling and wetting, 5 is characterized as defect free coatings.

TABLE 23

PUD lacquer formulation

| Chemicals | Percentage, % |
|---|---|
| Surfactant | 1.00 |
| Water | 25.00 |
| Daotan ® VTW 1236/40WANMP | 74.00 |
| Total | 100.00 |

A 1% formulation containing 1% surfactant of Example 10 was prepared and compared with control formulations containing no wetting agent and containing 1% of conventional organic wetting agent Comparative Example OPE.

Figure 4:
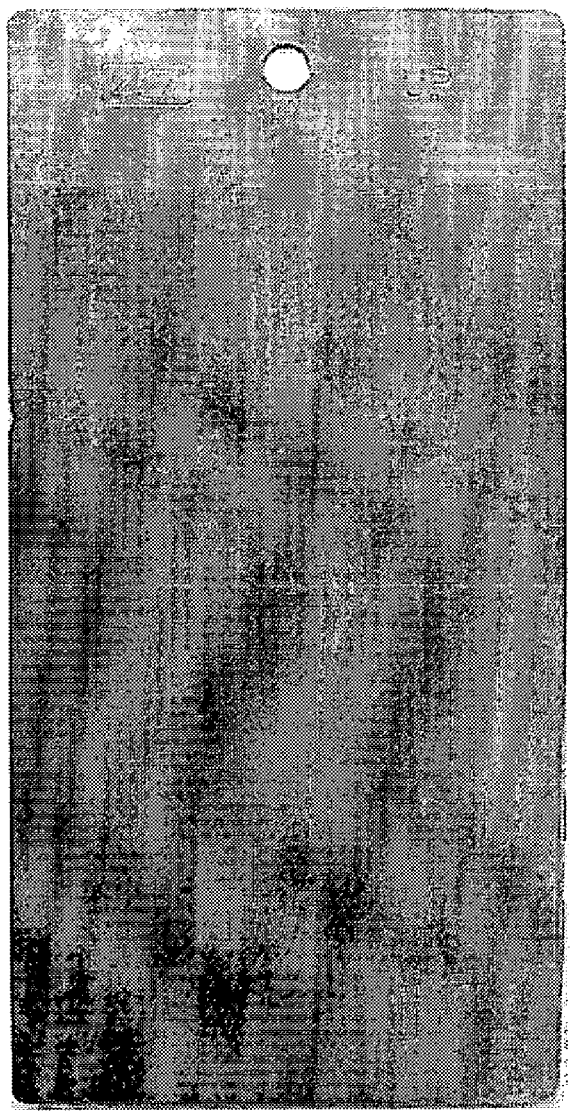
FIG. 4 displays a surface coated with a coating formulation prepared with 1% surfactant of Example 10.

FIG. 4 show the photographs of Daotan® VTW 1236/40WANMP system containing 1% of surfactant Example 10. Instant residual oil emulsification occurs which results in the uniform coating across the entire substrate. No de-wetting was observed and was give an aspect ranking of 5.

FIG. 4: Coating from Table 23 formulation containing 1% surfactant of Example 10.

In contrast control formulations with either no wetting agent (See FIG. 5) or 1% of Comparative Example OPE (See FIG. 6) shows complete dewetting and were both given an aspect ranking of 0. Dewetting starts to occur within seconds after perfectly uniform wet layer of lacquer applied to the surface.

Figure 5:
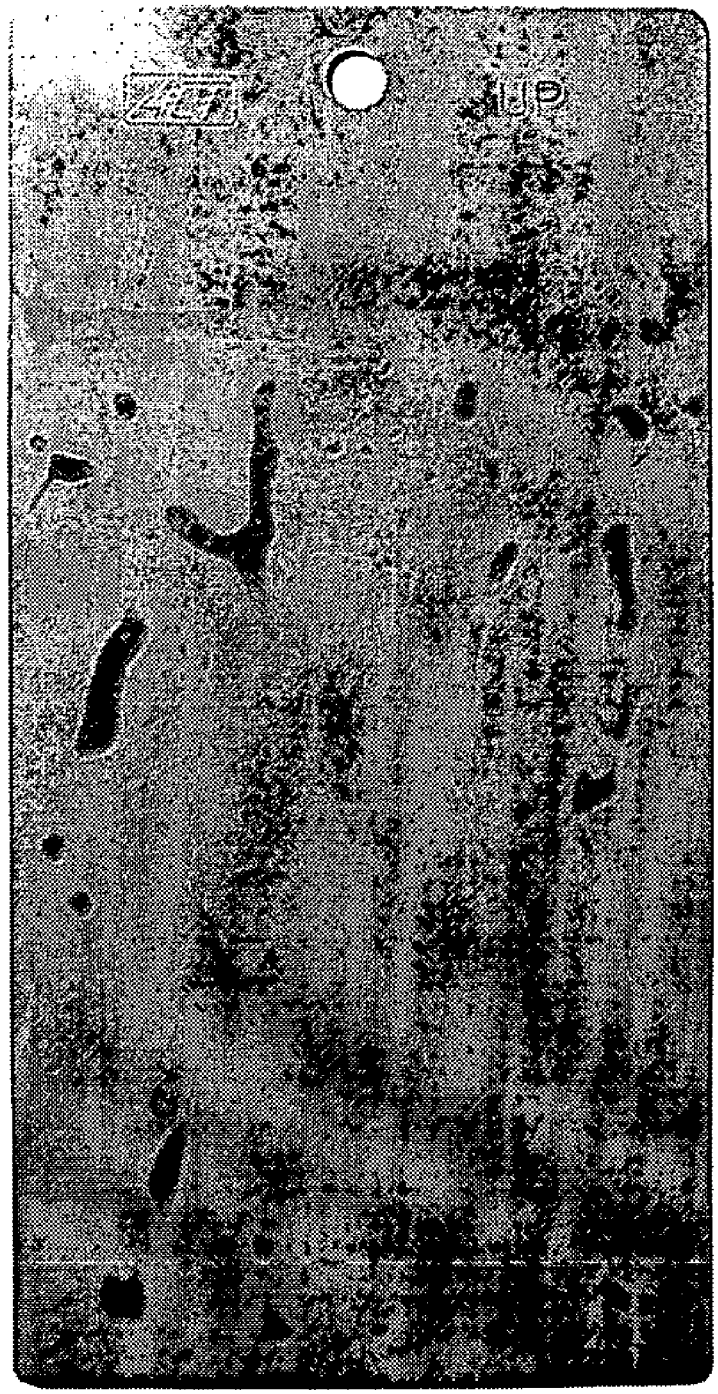
FIG. 5 displays a surface coated with a coating formulation containing 0% surfactant.

FIG. 5: Coating from Table 23 formulation containing 0% surfactant.

Figure 6:
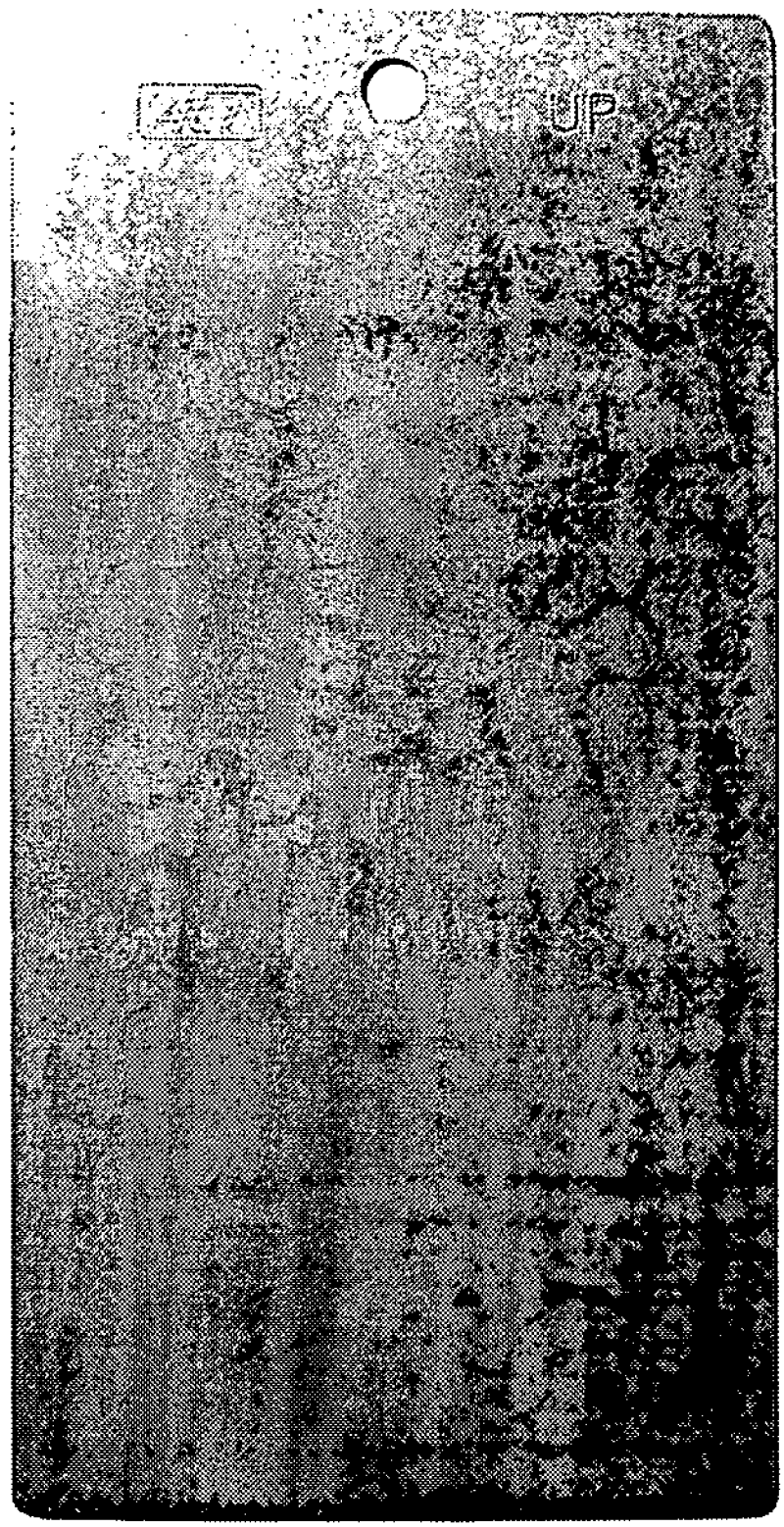
FIG. 6 displays a surface coated with a coating formulation containing 1% surfactant Comparative Example OPE.

FIG. 6: Coating from Table 23 formulation containing 1% surfactant Comparative Example OPE.

Example 16 was prepared as follows:

A model printing ink formulation based on Joncryl 537 system (Johnson Polymer) was developed to demonstrate the efficacy and advantages of the surfactants of the present invention and is shown in Table 24. Application of the coating was done using automatic film applicator; 25 microns rod at 25 to 30 DIN cup No. 4 and was allowed to air dry on 3 different substrates Low-density polyethylene, High-density polyethylene and Co-extruded polypropylene MB400 (Mobil) with formulations at pH 9.5. Visual evaluations were made one hour after application. The samples were rated using the visual aspect measurements on a scale of 0-5, 0 being coatings that are characterized with high occurrence of pin holing and complete lack of flow, leveling and wetting, 5 is characterized as defect free coatings. The Gloss of the coatings were measured with Byk Gardner glossmeter at 60°.

TABLE 24

Model printing ink formulation

| Name | Description | Supplier | Parts |
|---|---|---|---|
| Joncryl 537 | Acrylic Emulsion | Johnson Polymer | 60 |
| Dowanol DPnB | Coalescent | Dow | 6 |
| Jonwax 35 | Wax Dispersion | Johnson Polymer | 2 |
| Pigment paste | Pigment Blue (PB 15:4) dispersed in Joncryl 678 at 40% | Siegwerk | 5 |
| Surfactants: Examples; Comparative Examples; Surfynol 104E and Byk 348 | Flow, leveling and wetting agent | GE, Dow, Airproducts, Byk Chemie | 0.5-2 |
| Rheolate 210 | Thickener | Elementis Specialties | 1 |
| Water | Water | Distilled Water | To adjust to 100 parts |

The efficacy and gloss performance of the surfactants of present invention was compared with appropriate controls and is shown in Table 25. Additionally, Comparative Example non-ionic Surfynol 104 E is a non-silicone organic surfactant marketed by Air products and Comparative Example Byk 348 is silicone surfactant marketed by Byk Chemie.

TABLE 25

| Material | Loading | Aspect | Gloss (60 Deg) LDPE | Gloss (60 Deg) HDPE | Gloss (60 Deg) PP |
|---|---|---|---|---|---|
| None | 0% | 0 | 66 | 47 | 78 |
| Comp. Ex. E | 1% | 4 | 69 | 52 | 67 |
| Comp. Ex. Surfynol 104E | 1.50% | 4 | 67 | 50 | 74 |
| Comp. Ex. Byk 348 | 1% | 5 | 54 | 50 | 65 |
| Example 10 | 0.50% | 5 | 67 | 51 | 76 |

The formulation presented in Table 24 with surfactant of Example 3 is more efficient than surfactant Comparative Example E, Comparative Example surfynol 104E and Comparative Example Byk 348, provides equal or improved aspect rating even at lower concentrations while maintaining excellent gloss properties on all three substrates.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

The invention claimed is:

1. A coating composition comprising:
   a) a silicone having the formula:

MM' where $M = R^1 R^2 R^3 SiO_{1/2}$;

$M' = R^4 R^5 R^6 SiO_{1/2}$;

with $R^1$ selected from the group consisting of branched monovalent hydrocarbon radical of from 3 to 6 carbon atoms and $R^7$, where $R^7$ is selected from the group consisting of $R^8 R^9 R^{10} SiR^{12}$ and $(R^4 R^5 R^6) SiR^{12} (Si(R^2 R^3) SiO_{1/2})$ with $R^8$, $R^9$, and $R^{10}$ each independently selected from the group of monovalent hydrocarbon radicals having from 1 to 6 carbon atoms and monovalent aryl or alkaryl hydrocarbon radicals having from 6 to 13 carbon atoms and $R^{12}$ is a divalent hydrocarbon radical having from 1 to 3 carbon atoms, $R^2$ and $R^3$ are each independently selected from the group of from 1 to 6 carbon atom monovalent hydrocarbon radicals or $R^1$, with $R^4$ an alkylpolyalkyleneoxide bearing substituent selected from the group consisting of:

$R^{13}(C_2H_4O)_a(C_3H_6O)_b(C_4H_8O)_c R^{14}$ and $R^{12}SiR^4R^5(R^{13}(C_2H_4O)_a(C_3H_6O)_b(C_4H_8O)_c R^{14})$ where $R^{13}$ is a divalent linear or branched hydrocarbon radical having the structure:

—$CH_2$—$CH(R^{15})(R^{16})_d O$— where $R^{15}$ is H or methyl; $R^{16}$ is a divalent alkyl radical of 1 to 6 carbons where the subscript d may be 0 or 1;

$R^{14}$ is selected from the group consisting of H, monovalent hydrocarbon radicals of from 1 to 6 carbon atoms and acetyl where the subscripts a, b and c are zero or positive and satisfy the following relationships:

$$2 \leq a+b+c \leq 20 \text{ with } a \geq 2,$$

and $R^5$ and $R^6$ are each independently selected from the group of monovalent hydrocarbon radicals having from 1 to 6 carbon atoms or $R^4$; and b) at least one coating resin, wherein the composition exhibits enhanced resistance to hydrolysis.

2. The coating composition of claim 1 wherein $R^1$ is isopropyl.

3. The coating composition of claim 1 wherein $R^1$ is isobutyl.

4. The coating composition of claim 1 wherein $R^1$ is tert-butyl.

5. The coating composition of claim 1 wherein $R^1$ is $R^7$ and $R^7$ has the formula:

$R^8R^9R^{10}SiR^{12}$ with $R^8$, $R^9$, and $R^{10}$ each methyl and $R^{12}$ is a divalent hydrocarbon radical having 2 carbon atoms.

6. The coating composition of claim 1 wherein $R^{15}$ is hydrogen.

7. The coating composition of claim 1 wherein $R^2$ is methyl.

8. The coating composition of claim 2 wherein $R^{15}$ is hydrogen.

9. The coating composition of claim 2 wherein $R^2$ is methyl.

10. The coating composition of claim 3 wherein $R^{15}$ is hydrogen.

11. The coating composition of claim 3 wherein $R^2$ is methyl.

12. The coating composition of claim 4 wherein $R^{15}$ is hydrogen.

13. The coating composition of claim 4 where $R^2$ is methyl.

14. The coating composition of claim 5 wherein $R^{14}$ is hydrogen.

15. The coating composition of claim 5 wherein $R^2$ is methyl.

16. An aqueous emulsion wherein the discontinuous phase comprises water and the continuous phase comprises the composition of claim 1.

17. An aqueous emulsion wherein the continuous phase comprises water and the discontinuous phase comprises the composition of claim 1.

18. A non-aqueous emulsion wherein the discontinuous phase comprises a non-aqueous hydroxylic solvent and the continuous phase comprises the composition of claim 1.

19. A non-aqueous emulsion wherein the continuous phase comprises a non-aqueous hydroxylic solvent and the discontinuous phase comprises the composition of claim 1.

20. The coating composition of claim 1 wherein the coating resin is at least one selected from the group consisting of polyesters, acrylics, epoxies, polyurethanes, alkyds, chlorinated polyolefins, polyvinylidene fluoride, urethane-polyester copolymers, styrene-butadiene copolymers, acrylic-urethane copolymers, PVC, epoxy esters, epoxy-aminos, epoxy-phenolic, phenolics, styrene-acrylics, epoxy acrylics, urethane-acrylics, silicones, acylic-polyesters, epoxy-polyamides, fluoropolymers, polyvinyl acetate, vinyl-acrylics, silicone-acrylics, vinyl acetate-ethylene, styrene-acrylics, hydrocarbon, vinyl acetate-acrylics and silane systems.

21. The coating composition of claim 1 further comprising at least one co-surfactant selected from the group consisting of alkoxylates, ethoxylates, block copolymers of ethylene oxide, copolymers of ethylene oxide, copolymers of propylene oxide, copolymers of butylene oxide, alkyl phenol ethoxylate, alkyl phenol propoxylate, arylarylalkoxylates, amine alkoxylates, amine ethoxylates, fatty acid alkoxylates, fatty alcohol alkoxylates, alkyl sulfonates, alkyl benzene sulfonates, alkyl naphthalene sulfonates, sulfated fatty alcohols, sulfated fatty alcohols, sulfated fatty amines, sulfated fatty acid amides, acid esters of sodium isethionate, esters of sodium sulfosuccinate, sulfated fatty acid esters, sulfonated fatty acid esters, petroleum sulfonates, N-acyl sarcosinates, alkyl polyglycosides, alkyl ethoxylated amines, alkyl acetylenic diols, pyrrilodone based surfactants, 2-ethyl hexyl sulfate, isodecyl alcohol ethoxylates, ethylene diamine alkoxylates, ethylene oxide/propylene oxide copolymers, diphenyl ether Gemini type surfactants, ethylene oxide/propylene oxide copolymers, amine ethoxylates, alkyl polyglycosides, and oxo-tridecyl alcohol ethoxylates.

22. The coating composition of claim 1 wherein the silicone is present in an amount from about 0.01 to about 5 weight percent of the total composition.

23. The coating composition of claim 1 wherein the silicone is present in an amount from about 0.05 to about 2 weight percent of the total composition.

24. The coating composition of claim 1 wherein the silicone is present in an amount from about 0.01 to 1 weight percent of the total composition.

25. The coating composition of claim 1 exhibiting enhanced wetting, flow and leveling compared to the composition absent said silicone.

26. A substrate coated with coating composition of claim 1.

27. A printing ink composition comprising:

a) a silicone having the general formula:

MM' where $M=R^1R^2R^3SiO_{1/2}$;

$M'=R^4R^5R^6SiO_{1/2}$;

with $R^1$ selected from the group consisting of branched monovalent hydrocarbon radical of from 3 to 6 carbon atoms and $R^7$, where $R^7$ is selected from the group consisting of $R^8R^9R^{10}SiR^{12}$ and $(R^4R^5R^6)SiR^{12}(Si(R^2R^3)SiO_{1/2})$ with $R^8$, $R^9$, and $R^{10}$ each independently selected from the group of monovalent hydrocarbon radicals having from 1 to 6 carbon atoms and monovalent aryl or alkaryl hydrocarbon radicals having from 6 to 13 carbon atoms and $R^{12}$ is a divalent hydrocarbon radical having from 1 to 3 carbon atoms, $R^2$ and $R^3$ are each independently selected from the group of from 1 to 6 carbon atom monovalent hydrocarbon radicals or $R^1$, with $R^4$ an alkylpolyalkyleneoxide bearing substituent selected from the group consisting of:

$R^{13}(C_2H_4O)_a(C_3H_6O)_b(C_4H_8O)_cR^{14}$ and $R^{12}SiR^4R^5(R^{13}(C_2H_4O)_a(C_3H_6O)_b(C_4H_8O)_cR^{14})$ where $R^{13}$ is a divalent linear or branched hydrocarbon radical having the structure:

—$CH_2$—$CH(R^{15})(R^{16})_dO$— where $R^{15}$ is H or methyl; $R^{16}$ is a divalent alkyl radical of 1 to 6 carbons where the subscript d may be 0 or 1;

$R^{14}$ is selected from the group consisting of H, monovalent hydrocarbon radicals of from 1 to 6 carbon atoms and acetyl where the subscripts a, b and c are zero or positive and satisfy the following relationships:

$$2 \leq a+b+c \leq 20 \text{ with } a \geq 2,$$

and $R^5$ and $R^6$ are each independently selected from the group of monovalent hydrocarbon radicals having from 1 to 6 carbon atoms or $R^4$; and b) at least one printing ink resin, wherein the composition exhibits enhanced resistance to hydrolysis.

28. The printing ink composition of claim 27 wherein the printing ink resin is a least one selected from the group consisting of, polyurethanes, acrylics, polyacrylates, epoxies, polyamides, polyesters, alkyds, nitrocellulosics, ketonic resin, maleic resin, polyvinyl chlorides, polyvinyl butyral, acrylic and styrene acrylics, polyacrylates, polyvinylics, polyamides, epoxy acrylates, urethane acrylates, styrene acrylics, polyesters acrylates and their relative monomers bearing unsaturations.

29. The printing ink composition of claim 27 wherein $R^1$ is iso-propyl.

30. The printing ink composition of claim 27 wherein $R^1$ is iso-butyl.

31. The printing ink composition of claim 27 wherein $R^1$ is tert-butyl.

32. The printing ink composition of claim 27 wherein $R^1$ is $R^7$ and $R^7$ has the formula: $R^8R^9R^{10}SiR^{12}$ with $R^8$, $R^9$, and $R^{10}$ each methyl and $R^{12}$ is a divalent hydrocarbon radical having 2 carbon atoms.

33. The printing ink composition of claim 27 wherein $R^{15}$ is hydrogen.

34. The printing ink composition of claim 27 wherein $R^2$ is methyl.

35. The printing ink composition of claim 28 wherein $R^{15}$ is hydrogen.

36. The printing ink composition of claim 28 wherein $R^2$ is methyl.

37. The printing ink composition of claim 29 wherein $R^{15}$ is hydrogen.

38. The printing ink composition of claim 29 wherein $R^2$ is methyl.

39. The printing ink composition of claim 30 wherein $R^{15}$ is hydrogen.

40. The printing ink composition of claim 30 wherein $R^2$ is methyl.

41. The printing ink composition of claim 31 wherein $R^{15}$ is hydrogen.

42. The printing ink composition of claim 31 wherein $R^2$ is methyl.

43. An aqueous emulsion wherein the discontinuous phase comprises water and the continuous phase comprises the composition of claim 27.

44. An aqueous emulsion wherein the continuous phase comprises water and the discontinuous phase comprises the composition of claim 27.

45. A non-aqueous emulsion wherein the discontinuous phase comprises a non-aqueous hydroxylic solvent and the continuous phase comprises the composition of claim 27.

46. A non-aqueous emulsion wherein the continuous phase comprises a non-aqueous hydroxylic solvent and the discontinuous phase comprises the composition of claim 27.

47. The printing ink composition of claim 27 further comprises at least one co-surfactant selected from the group consisting of alkoxylates, ethoxylates, block copolymers of ethylene oxide, copolymers of ethylene oxide, copolymers of propylene oxide, copolymers of butylene oxide, alkyl phenol ethoxylate, alkyl phenol propoxylate, arylarylalkoxylates, amine alkoxylates, amine ethoxylates, fatty acid alkoxylates, fatty alcohol alkoxylates, alkyl sulfonates, alkyl benzene sulfonates, alkyl naphthalene sulfonates, sulfated fatty alcohols, sulfated fatty alcohols, sulfated fatty amines, sulfated fatty acid amides; acid esters of sodium isethionate, esters of sodium sulfosuccinate, sulfated fatty acid esters, sulfonated fatty acid esters, petroleum sulfonates, N-acyl sarcosinates, alkyl polyglycosides, alkyl ethoxylated amines, alkyl acetylenic diols, pyrrilodone based surfactants, 2-ethyl hexyl sulfate, isodecyl alcohol ethoxylates, ethylene diamine alkoxylates, ethylene oxide/propylene oxide copolymers, diphenyl ether Gemini type surfactants, ethylene oxide/propylene oxide copolymers, amine ethoxylates, alkyl polyglycosides, and oxo-tridecyl alcohol ethoxylates.

48. The printing ink composition of claim 27 wherein the silicone is present in an amount from about 0.01 to about 5 weight percent of the total composition.

49. The printing ink composition of claim 27 wherein the silicone is present in an amount from about 0.05 to about 2 weight percent of the total composition.

50. The printing ink composition of claim 27 wherein the silicone is present in an amount from about 0.01 to 1 weight percent of the total composition.

51. The printing ink composition of claim 27 exhibiting enhanced wetting, flow and leveling compared to the composition absent said silicone.

* * * * *